Jan. 7, 1936.  E. D. FLYNN  2,026,969
METHOD FOR TREATMENT OF SEWAGE
Filed May 13, 1932
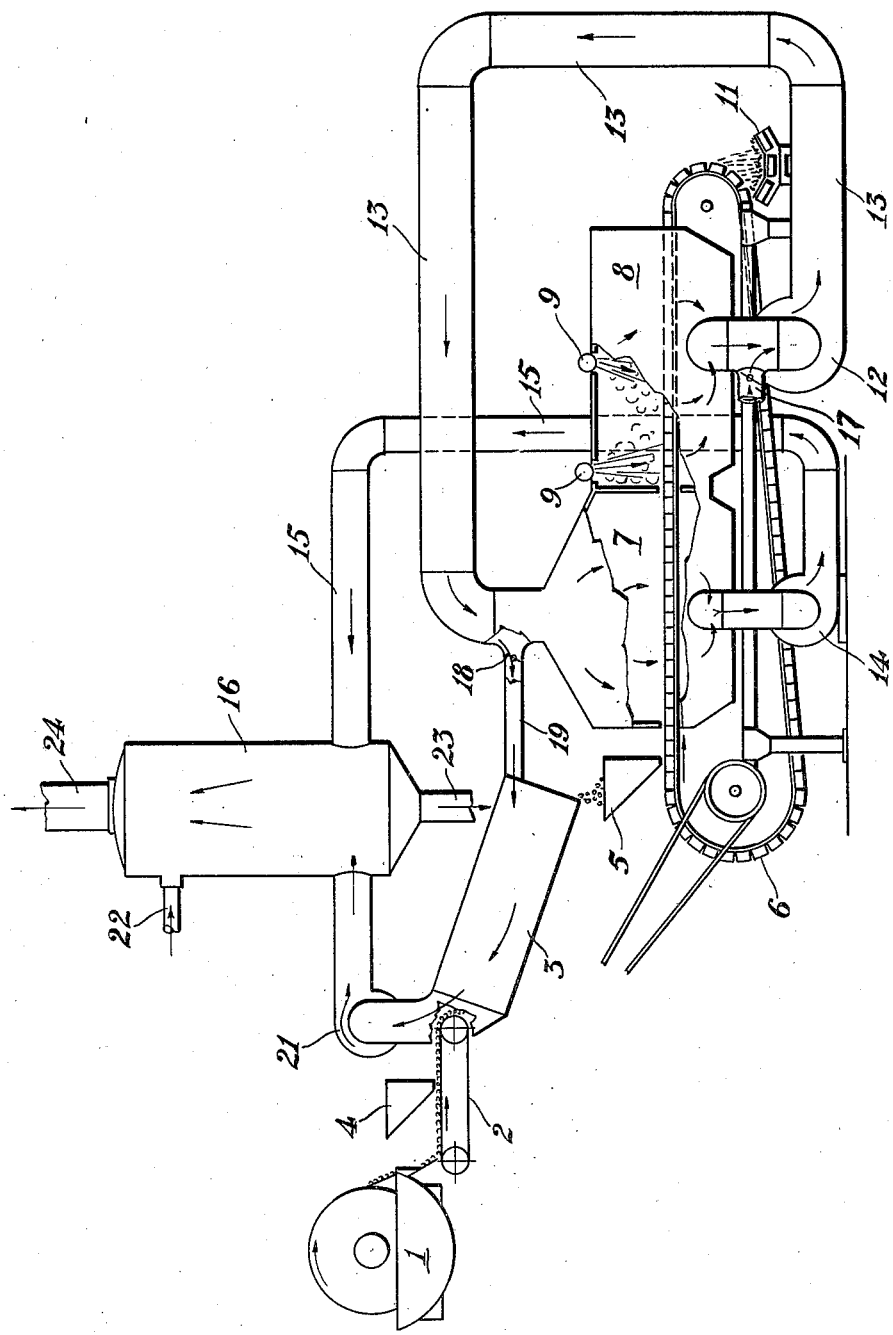
INVENTOR
*Edward D. Flynn*
BY
*[signature]*
ATTORNEY Patented Jan. 7, 1936

2,026,969

UNITED STATES PATENT OFFICE 2,026,969

METHOD FOR TREATMENT OF SEWAGE

Edward D. Flynn, New Rochelle, N. Y., assignor, by mesne assignments, to Oliver United Filters Incorporated, San Francisco, Calif., a corporation of Nevada Application May 13, 1932, Serial No. 611,159

4 Claims. (Cl. 110—15)

This invention relates to a process for treating sewage and to a combination of apparatus for carrying out the process.

Until rather recent years it has been the practice to dispose of sewage by dumping it into conveniently located water courses or by conveying it out to sea, but with the concentration of population in large cities this practice, for obvious reasons, has become decidedly objectionable. In many instances legislation has been enacted preventing the pollution of streams and requiring some sanitary method of sewage disposal.

At the present time sewage is subjected to various treatments, in some instances it is digested, in others it is subjected to the activated sludge process or is otherwise treated to render the organic putrid content unobjectionable. After the solid content is separated from the liquid content the former may be used as a fertilizer, while the latter may be thrown to waste or used for irrigation purposes. The value of the solid content as a fertilizer is somewhat limited, and it has recently developed that the fertilizer produced in this manner is far in excess of its demand. Consequently there is an urgent need of some method of completely disposing of the solid content of sewage whether it be raw, activated, digested, or otherwise treated.

In general the object of this invention is the provision of a process whereby the solid content of sewage can be economically burned or incinerated.

Another object of the invention resides in putting the sludge in a suitable condition for incineration.

Still another object of the invention is the provision of a suitable combination of equipment whereby sewage sludge can be continuously filtered, dried and incinerated.

The invention possesses other advantageous features, some of which with the foregoing, will be set forth at length in the following description where I shall outline in full that form of my invention which I have selected for illustration in the drawing accompanying and forming part of the present specification. In said drawing, I have shown one form of my invention, but it is to be understood that I do not limit myself to such form, since the invention as set forth in the claims, may be embodied in a plurality of forms.

Referring to the drawing:

The single figure shown is a diagrammatic representation in the nature of a flow sheet illustrating my process and the equipment required to carry it out.

In brief the process consists in continuously filtering sewage sludge to effect an initial separation of the solid content from the liquid content.

I have found that the filter cake, when sufficiently dehydrated, can be burned by its own calorific content with the addition of only a small quantity of extraneous fuel and that this additional fuel can be conveniently added to the sludge prior to filtration in the form of a combustible filter aid such as for example coal dust or coke breeze. It is to be noted that when added in this manner the coal dust or coke breeze serves a double function, first as a filter aid and then as fuel for aiding in the combustion of the cake. The amount of filter aid added should be substantially sufficient to completely burn the filter cake under the conditions at which it is fed to the incinerator. The cake discharged from the filter is then continuously fed to a pelletizer where it is formed into small pellets with the aid of hot exhaust gases from the incinerator. If the particular sewage being handled can be filtered without the use of a filter aid, the coal dust or coke breeze can be added in the pelletizer to aid in pelletizing the sludge and in subsequently burning it and in some instances it may be found desirable to use both a filter aid and a pelletizing aid. The disintegrated sludge or pellets are then dried and incinerated, the hot exhaust gases from the incinerator being passed first through the dryer and the pelletizer and finally through a scrubber for deodorizing them.

Although the steps of pelletizing and drying should be carried out at as high temperatures as possible without distilling or driving off noxious odors, the incinerator should preferably be operated at 800° F. or higher in order to burn as much of the noxious gases as possible before circulating them through the dryer and pelletizer.

The process above disclosed may be conveniently carried out as follows:

The sewage sludge is continuously fed to a tank of a continuous filter 1 of known design and the combustible filter aid may be introduced into the sludge before it is fed to the filter or directly to the filter tank. An endless conveyor 2 receives the cake discharged from the filter and feeds it into the upper end of a pelletizer 3 which disintegrates, rolls and tumbles the cake to form it into small discrete balls or pellets. The pelletizer 3 may conveniently consist of a rotating cylindrical shell having its axis inclined to the horizontal and provided on its interior surface with vanes which operate to roll and tumble the cake or solids fed to it as the material passes through it. If, due to the nature of the cake formed on the filter, it is found unnecessary to use a filter aid, the coal dust or coke breeze may be mixed with the filtered cake by means of a hopper 4 located above the endless conveyor 2, or instead of introducing the coal dust at this point it may be fed to the pelletizer and there mixed with the cake during the process of pelletizing.

The pelletized mixture of sludge and comminuted combustible material drops by gravity into a hopper 5 from which the pellets are fed to an endless conveyor 6 which carries the pellets first through a drying chamber 7 and then through an incinerator 8. The incinerator is fired by means of burners 9 located above the conveyor 6 and directed towards the conveyor. A conveyor 11 receives the incinerated sludge which falls by gravity from the conveyor 6 and carries it away for further treatment or final disposition.

A fan 12 serves to draw the flames from the burners 9 in contact with the pelletized sludge and to force the exhaust gases through a conduit 13 into the upper end of the dryer 7 and the lower end of the pelletizer 3. A second fan 14, draws the hot gases in the dryer 7 through the pelletized cake and then forces the spent gases through a conduit 15 into the lower end of a scrubber 16 of any well known type.

A fresh air intake 17 is provided ahead of the blower 12 for introducing any desired amount of fresh air into the system and a damper 18 located between the conduit 13 and the lower end of the pelletizer 3, serves as a means for controlling the relative amounts of hot gases which are introduced into the dryer and the pelletizer.

The hot gases passing into the pelletizer are drawn therethrough by means of a fan 21 and are then forced into the lower end of the scrubber 16. The gases introduced into the scrubber contact in the usual manner with a plurality of streams of water passing downwardly through the scrubber. A water intake 22 is provided in the upper end of the scrubber and an outlet 23 at the lower end, the deodorized gases passing off by way of a conduit 24.

It is to be noted that the sludge and hot gases travel in a countercurrent manner and that the sludge is disintegrated or pelletized before being conveyed to the dryer and the incinerator and that as a consequence it is in a form which permits of efficient drying and burning.

The details of construction and operation of the various prices of equipment utilized in carrying out my process have not been set forth, for although they have been arranged in a novel combination, they are per se well known.

I claim:

1. The method of disposing sewage sludge comprising filtering the sludge to effect an initial separation of solids and liquid, adding a sufficient quantity of communited combustible material to the resulting filter cake and pelletizing the filter cake with said combustible material by continuously rolling and tumbling same in the presence of hot gases to form pellets substantially capable of supporting their own combustion, drying said pellets to extract a further quantity of moisture, burning the dried pellets, and utilizing the gaseous products of combustion in the steps of drying and pelletizing.

2. The method of treating sewage sludge comprising effecting a separation of its solid and liquid phases; continuously rolling and tumbling the separated solids in the presence of a sufficient quantity of hot gases and a comminuted combustible material to form pellets substantially capable of supporting their own combustion; drying said pellets to extract a further quantity of moisture; burning the dried pellets and utilizing the gaseous products of combustion in the steps of drying and pelletizing.

3. The method of treating sewage sludge comprising effecting a separation of its solid and liquid phases; continuously rolling and tumbling the separated solids in the presence of a sufficient quantity of hot gases and a comminuted combustible material to form pellets substantially capable of supporting their own combustion; burning the pellets so formed and utilizing the gaseous products of combustion in the step of pelletizing.

4. The method of treating sewage sludge comprising effecting a separation of its solid and liquid phases; continuously rolling and tumbling the separated solids in the presence of a sufficient quantity of a comminuted combustible material to form pellets substantially capable of supporting their own combustion; drying said pellets to extract a further quantity of moisture; burning the dried pellets, and utilizing the gaseous products of combustion in the step of drying.

EDWARD D. FLYNN.